(12) United States Patent
Blackaby (10) Patent No.: US 7,192,231 B2
(45) Date of Patent: Mar. 20, 2007

(54) CAGE NUT WITH NON-CROSS THREADING ANGLED CAGE

(75) Inventor: Colin Blackaby, Greenfield, IN (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/818,442

(22) Filed: Apr. 5, 2004

(65) Prior Publication Data

US 2005/0220562 A1   Oct. 6, 2005

(51) Int. Cl.
F16B 39/284 (2006.01)
F16B 37/04 (2006.01)

(52) U.S. Cl. .................. 411/111; 411/171; 411/103; 411/432; 411/112

(58) Field of Classification Search ............ 411/171, 411/111, 112, 113, 103, 432
See application file for complete search history.

(56) References Cited

U.S. PATENT DOCUMENTS

| 2,144,350 | A |   | 1/1939  | Swanstrom |           |
|-----------|---|---|---------|-----------|-----------|
| 2,144,553 | A |   | 1/1939  | Simmonds  |           |
| 2,167,285 | A |   | 7/1939  | Smith     |           |
| 2,237,595 | A |   | 4/1941  | Dyer      |           |
| 2,299,158 | A |   | 10/1942 | Luce      |           |
| 2,303,148 | A | * | 11/1942 | Tinnerman | ......... 411/111 |
| 2,310,532 | A |   | 2/1943  | Langmaid  |           |
| 2,333,386 | A | * | 11/1943 | Murphy    | ......... 411/84 |
| 2,384,729 | A |   | 9/1945  | Darby     |           |
| 2,390,752 | A |   | 12/1945 | Tinnerman |           |
| 2,405,925 | A | * | 8/1946  | Poupitch  | ......... 411/113 |
| 2,421,201 | A |   | 5/1947  | Hallock   |           |
| 2,421,278 | A |   | 5/1947  | Luce      |           |
| 2,429,833 | A |   | 10/1947 | Luce      |           |
| 2,469,311 | A |   | 5/1949  | Poupitch  |           |
| 2,567,864 | A |   | 9/1951  | Becker    |           |
| 2,575,594 | A |   | 11/1951 | Reiner    |           |
| 2,695,046 | A | * | 11/1954 | Tinnerman, III | ........ 411/112 |
| 2,705,991 | A |   | 4/1955  | Reiner    |           |
| 2,707,507 | A |   | 5/1955  | Tripp et al. |        |
| 2,716,434 | A | * | 8/1955  | Crowther  | ......... 411/106 |
| 2,825,380 | A |   | 3/1958  | Reiner    |           |
| 2,879,820 | A |   | 3/1959  | Trzcinski |           |
| 2,909,206 | A |   | 10/1959 | Johnson   |           |
| 2,936,806 | A |   | 5/1960  | Harper    |           |
| 2,967,556 | A |   | 1/1961  | Jaworski  |           |
| 2,968,329 | A |   | 1/1961  | Reiner    |           |
| 3,025,897 | A | * | 3/1962  | Gieleghem | ......... 411/113 |
| 3,035,624 | A |   | 5/1962  | Jaworski  |           |
| 3,060,988 | A | * | 10/1962 | Munse     | ......... 411/103 |
| 3,140,738 | A |   | 7/1964  | Johnson   |           |
| 3,189,076 | A |   | 6/1965  | Adams     |           |
| 3,219,086 | A |   | 11/1965 | Zahodiakin |          |

(Continued)

FOREIGN PATENT DOCUMENTS

DE    7411490    6/1974

(Continued)

*Primary Examiner*—Katherine Mitchell
(74) *Attorney, Agent, or Firm*—Harness, Dickey & Pierce, P.L.C.

(57) ABSTRACT

A cage nut assembly is disclosed having a body defining a through bore. The cage is disposed about at least a portion of the body. The body is hexagonal in shape, while the cage defines a seam configured to be placed adjacent the coupling surface of the cage and base material.

4 Claims, 7 Drawing Sheets

U.S. PATENT DOCUMENTS

| | | |
|---|---|---|
| 3,259,164 A | 7/1966 | Hernadi |
| 3,259,165 A | 7/1966 | Tobian et al. |
| 3,322,177 A | 5/1967 | Phelan |
| 3,363,084 A | 1/1968 | Busing |
| 3,446,261 A | 5/1969 | Dey |
| 3,556,570 A | 1/1971 | Cosenza |
| 3,671,710 A | 6/1972 | Coombs |
| 3,695,324 A | 10/1972 | Gulistan |
| 3,785,421 A | 1/1974 | Launay |
| 3,877,342 A | 4/1975 | Duchatellier |
| 4,015,650 A | 4/1977 | Anderson |
| 4,186,787 A | 2/1980 | Husain |
| 4,193,435 A | 3/1980 | Charles et al. |
| 4,377,359 A | 3/1983 | Peterson |
| 4,462,710 A | 7/1984 | Leitner |
| 4,652,468 A | 3/1987 | Gould et al. |
| 4,701,348 A | 10/1987 | Neville |
| 4,762,451 A | 8/1988 | Collins |
| 4,793,757 A | 12/1988 | Peterson |
| 4,798,507 A | 1/1989 | Olah |
| 4,828,440 A | 5/1989 | Anderson et al. |
| 4,830,557 A | 5/1989 | Harris et al. |
| 4,835,819 A | 6/1989 | Duffy |
| 4,856,954 A | 8/1989 | Peterson |
| 4,875,816 A | 10/1989 | Peterson |
| 4,875,817 A | 10/1989 | Suzumura et al. |
| 4,911,591 A | 3/1990 | Oaks |
| 4,984,319 A | 1/1991 | Reynolds |
| 5,022,804 A | 6/1991 | Peterson |
| RE33,766 E | 12/1991 | Duffy et al. |
| 5,096,349 A | 3/1992 | Landy et al. |
| 5,096,350 A * | 3/1992 | Peterson ..................... 411/12 |
| 5,137,406 A | 8/1992 | Cosenza |
| 5,146,668 A | 9/1992 | Gulistan |
| 5,193,643 A | 3/1993 | McIntyre |
| 5,221,170 A | 6/1993 | Duffy et al. |
| 5,380,136 A | 1/1995 | Copple et al. |
| 5,405,228 A | 4/1995 | Reid et al. |
| 5,423,646 A | 6/1995 | Gagnon |
| 5,542,158 A | 8/1996 | Gronau et al. |
| 5,605,353 A | 2/1997 | Moss et al. |
| 5,624,319 A | 4/1997 | Golczyk et al. |
| 5,630,686 A | 5/1997 | Billmann |
| 5,655,865 A | 8/1997 | Plank et al. |
| 5,679,160 A | 10/1997 | Wallace et al. |
| 5,750,190 A | 5/1998 | Woodhall et al. |
| 5,893,694 A | 4/1999 | Wilusz et al. |
| 5,918,727 A | 7/1999 | Wallace et al. |
| 5,928,711 A | 7/1999 | Wallace et al. |
| 5,947,518 A | 9/1999 | Redman et al. |
| 5,961,264 A | 10/1999 | Postadan |
| 6,027,293 A | 2/2000 | Beemer et al. |
| 6,027,568 A | 2/2000 | Wallace et al. |
| RE36,681 E | 5/2000 | Rinderer |
| 6,109,849 A | 8/2000 | Nagayama |
| 6,141,837 A | 11/2000 | Wisniewski |
| 6,146,071 A | 11/2000 | Norkus et al. |
| 6,183,180 B1 | 2/2001 | Copple et al. |
| 6,287,064 B1 | 9/2001 | Jhumra et al. |
| 6,302,628 B1 | 10/2001 | Berecz et al. |
| 6,357,980 B1 | 3/2002 | Lansinger |
| 6,433,278 B1 | 8/2002 | Blank et al. |
| 6,450,747 B1 | 9/2002 | Fischer |
| 6,474,917 B2 * | 11/2002 | Gauron ..................... 411/112 |
| 6,575,680 B2 | 6/2003 | Herb et al. |
| 6,637,994 B2 | 10/2003 | Leistner |
| 6,644,902 B1 | 11/2003 | Cutshall |
| 6,692,206 B1 | 2/2004 | Clinch et al. |
| 6,758,645 B2 * | 7/2004 | Curley et al. ............... 411/111 |
| 6,854,941 B2 | 2/2005 | Csik |
| 2002/0182027 A1 | 12/2002 | Gauron |
| 2003/0202856 A1 | 10/2003 | Nilsen et al. |
| 2004/0005205 A1* | 1/2004 | Yake et al. ................. 411/112 |
| 2004/0033121 A1* | 2/2004 | Clinch et al. ............... 411/111 |

FOREIGN PATENT DOCUMENTS

| | | |
|---|---|---|
| DE | 7907821 | 7/1979 |
| DE | 3728219 | 3/1989 |
| DE | 4417397 | 11/1995 |
| DE | 29518398 | 3/1996 |
| EP | 1060826 | 12/2000 |
| EP | 1116890 | 7/2001 |
| GB | 1047545 | 11/1966 |
| GB | 2041138 | 9/1980 |
| WO | WO 03/042557 | 5/2003 |

* cited by examiner

CAGE NUT WITH NON-CROSS THREADING ANGLED CAGE

FIELD OF THE INVENTION

The present invention relates to an encaged threaded fastener, and, more particularly, to an encaged fastener which minimizes problems of cage deformation caused by miss-insertion of a threaded member into the fastener.

BACKGROUND OF THE INVENTION

With ever increasing design demands, flexibility and adaptivity of unibody construction is increasingly required in order to provide vehicles that meet broader customer needs. Increases in the number of components and structures which are coupled to the unibody construction have led designers to consistently add threaded fasteners to the unibody frame. Variation in manufacturing tolerances require that the fastener couple to the unibody frame in a way which allows a degree of positional adjustment during final assembly. This positional adjustment is provided by using a female fastener which is an encaged fastener. Typically, this takes the form of a nut encaged in a structure that is attached to the inner body frame. The cage is configured so as to provide the nut with a range of movement so that when a component is coupled to the frame, the alignment of the component and frame can be adjusted until they meet manufacturing standards. Unfortunately, mating surfaces are not always perpendicular.

Prior to final coupling of the components to the non-perpendicular surfaces of the frame, however, the fastener must be aligned to reduce the incidence of cross-threading of the fastener. To date, the step of rotating a fastener into the nut will often cause the fastener to cross-thread. This causes a significant amount of rework of the fastener joint and, therefore, causes manufacturing problems in the final assembly of the product. To prevent the manufacturing problems, post-process rework is often required to ensure that the fasteners can be properly coupled with an appropriate strength.

SUMMARY OF THE INVENTION

Accordingly, this invention provides a cage nut fastener which is weldable to a substructure that overcomes the problems and disadvantages of the cage nuts of the prior art. Briefly, the invention includes a fastener having a threaded head, a fastener cage capable of fastening the fastener to a substructure, the cage being formed having a top bearing surface which is angled with respect to a base bearing surface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The greatest advantage of the present invention will become apparent to one skilled in the art upon reading the following specification and by reference to the drawings in which:

FIG. 8 represents an unfolded view of the cage shown in FIG. 7a;

DETAILED DESCRIPTION OF THE PREFERRED EMBODIMENTS

The following description of the preferred embodiments is merely exemplary in nature and is in no way intended to limit the invention, its application, or uses.

Figure 1:
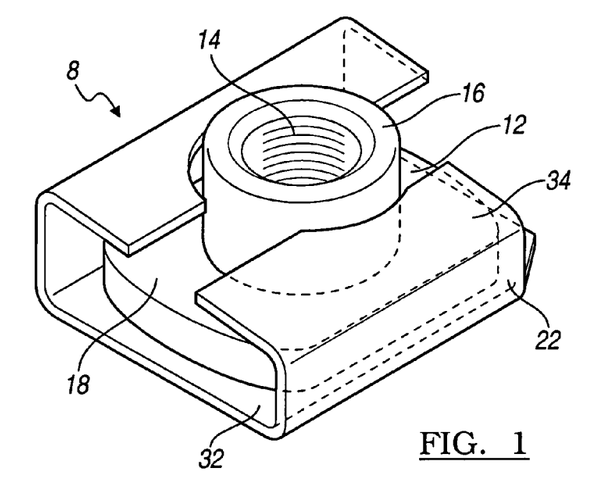
FIG. 1 is a perspective view of the cage nut fastener in its assembled condition.
Figure 2:
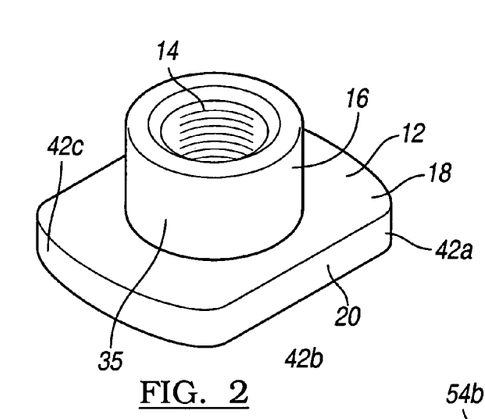
FIG. 2 is a perspective view of the nut and base plate of the present invention.
Figure 3:
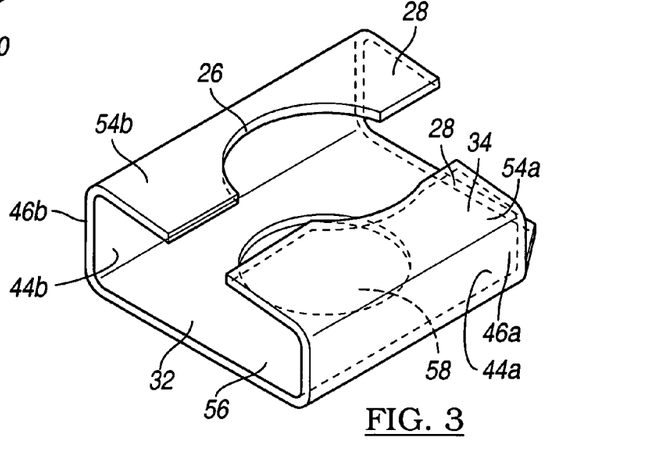
FIG. 3 is a perspective view of the cage in FIG. 1.

With reference to FIGS. 1–3, a cage nut fastener, shown generally at 8, has a body 16 coupled to a planar base 12. The body 16 and planar base 12 define a threaded through bore 14. Planar base 12 has an upper base surface 18 and lower base surface 20. The cage nut assembly 8 further has a cage 22 which is generally disposed about the planar base 12. The cage 22 has a cage upper surface 34 and cage lower surface 32. The cage 22 upper surface 34 is defined by a pair of co-planar flanges 28. The upper surface 34 defines a through hole 26 which generally corresponds to the shape of the body 16.

As best seen in FIG. 2, the body 16 takes the form of a cylinder 35 coupled to the planar base 12. The planar base 12 defines a hole which is co-axial to the threaded through bore 14 of the cylinder 35. It is preferred that the cylinder 35 be of a hot or cold formed body of suitable size defined by the needed configuration. Also, it is preferred that the cylinder 35 be of sufficient hardness through either heat treatment or metallurgy to ensure the proper coupling to the mating bolt (not shown).

As seen in FIG. 2, each corner 40a–d of the planar base 12 has defined radii 42a–c which function as load bearing surfaces to apply distributed loads to an interior surface 44a and 44b of the depending sidewalls 46a and 46b of the cage 22 when a bolt is inserted. The cage 22 is formed of a single folded piece of sheet metal 48. The cage 22 has a through hole 50 which has a diameter larger than the diameter of the cylinder 35. The side 52 of the hole 50 limits the travel of the cylinder 35 within the cage 22.

The pair of depending sidewalls 46a and 46b of the cage 22 functions to couple the top members 54a and 54b of the cage 22 to the weldable lower members 56. Additionally, the depending sidewalls 46a and 46b absorb torsional energy imparted onto the cage 22 by the corners 40a–d of the base 12. The height of the cage 22 minimizes the movement of the base 12 away from the lower member 56 and further allows the cylinder 35 to rotate to ensure proper alignment upon driving of the coupling threaded fastener (not shown).

Figure 4A:
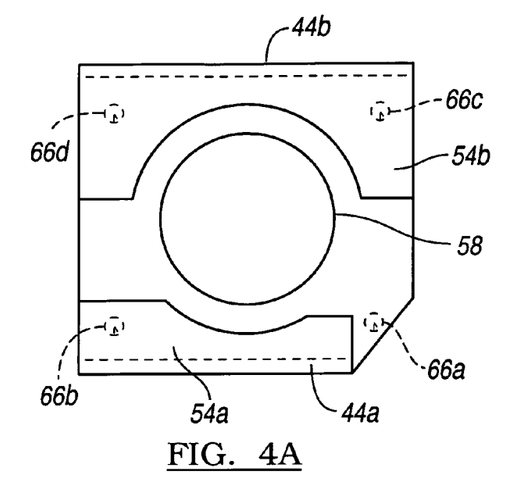
FIGS. 4a–4d represent top, side, and end views of the cage nut fastener shown in FIG. 3.
Figure 4B:
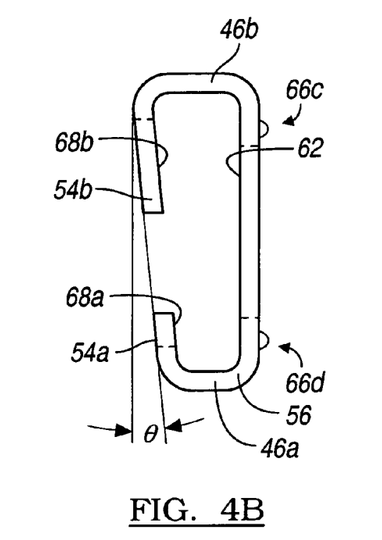
Figure 4C:
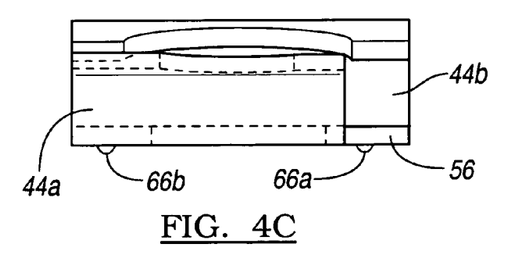

As seen in FIG. 4a, member 56 defines a through hole 58 which is co-axial to the passage of the cylindrical body 35 and the planar base 12. Additionally formed on the interior surface 62 defining the lower member 56 is a number of optional upturned tabs (not shown) which raise the base 12 above the lower members 56 to prevent adhesion during painting applications. Additionally defined on the lower member 56 is four weldment pad areas 66a–d which provide the area to allow welding of the cage 22 to the base substrate material.

Figure 4D:
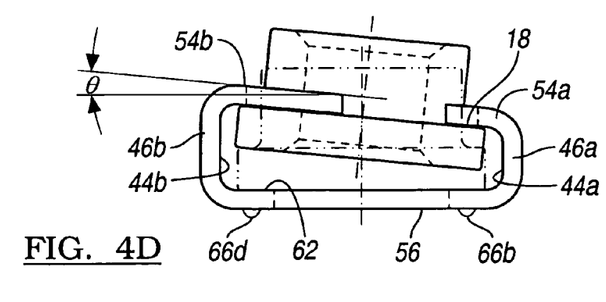
Figure 5:
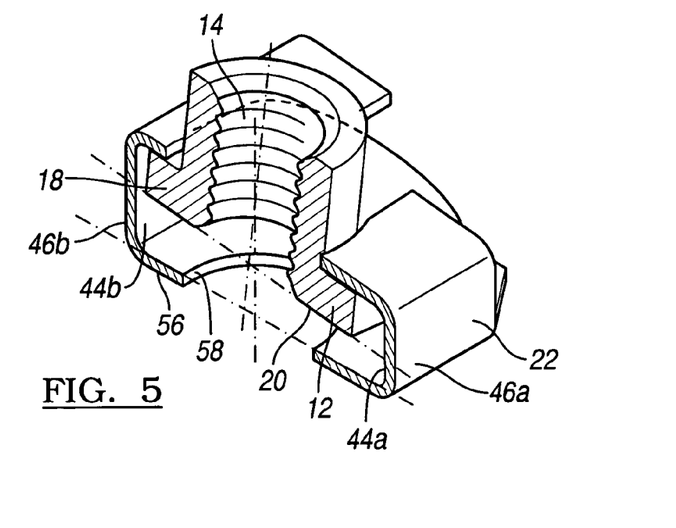
FIG. 5 represents a cross sectional perspective view of the cage nut shown in FIG. 1.

As best seen in FIGS. 4a–4c and 5, the sidewalls 44a and 44b have varying lengths. In this regard, the first sidewall 46a has a first length shorter than the sidewall 46b. Additionally, the top members 54a and 54b are co-planar as to the affixed angle (θ) from the surface defined by the lower member 32. This forms a pair of internal bearing surfaces 68a and 68b which are configured to interface with the upper base surface 18 of the planar base 12. As shown in FIGS. 4d and 5, the angled internal bearing surfaces 68a and 68b allow for the relative rotation of the body 16 with respect to the cage 12 at the defined angle (θ). The through bore 26 is sized so as to allow the rotation of the base 12 and cylindrical body 16.

Figure 6:
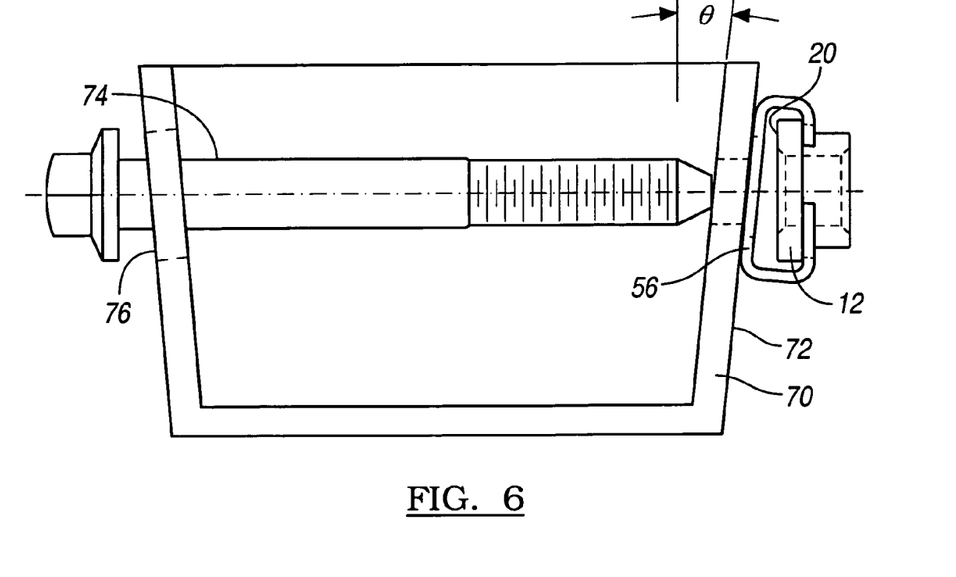
FIG. 6 represents the use of the cage nut shown in FIG. 1.

As shown in FIG. 6, the caged fastener 8 is welded onto a body 70 having an angled surface 72. As seen, the angle (θ) of the internal bearing surfaces 68a and 68b are configured to be perpendicular to the bolt 74. The body 70 optionally has a defined through slot 76 which allows the bolt 74 to be inserted at a first angle. Upon tightening of the bolt 74, the lower surface 20 of the planar base 12 interfaces with the lower member 56 to allow rotation of the bolt 44 within the slot 76.

Figure 7A:
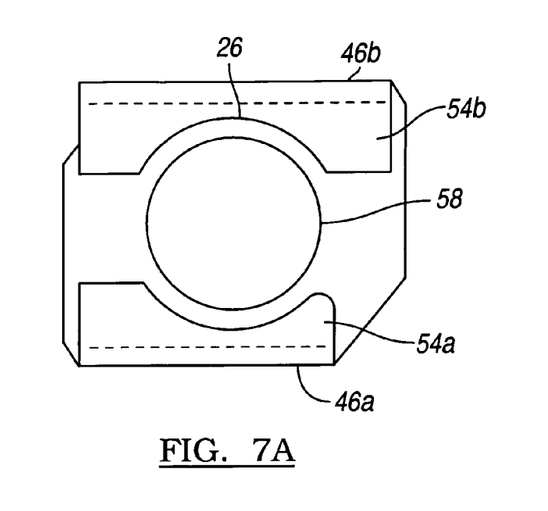
FIGS. 7a–7c represent top, side, and end views of an alternate cage.
Figure 7B:
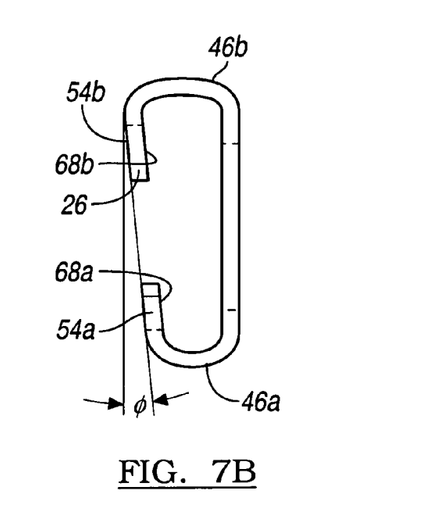
Figure 7C:
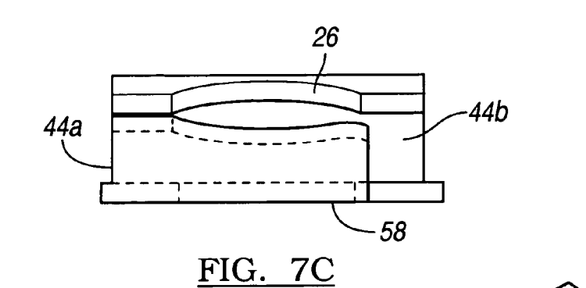

FIGS. 7a–7c represent an alternate configuration for the cage 22. As shown, the upper members 54a and 54b can take any suitable configuration which allows them to encase the body and base 12. Furthermore, the upper members 54a and 54b are configured to rotationally align the threaded bore 14 with a bolt which is inserted through the hole 58 at an angle which is non-perpendicular to the lower member 56.

Figure 8:
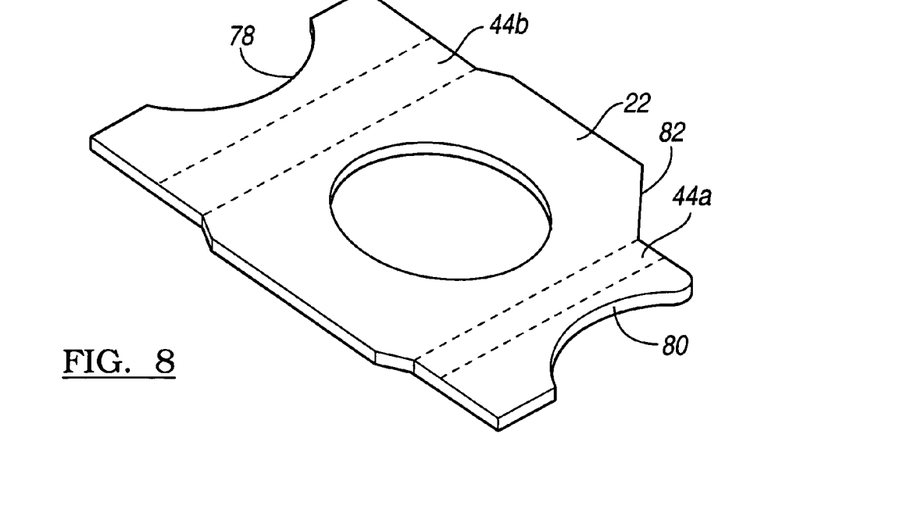
Figure 9:
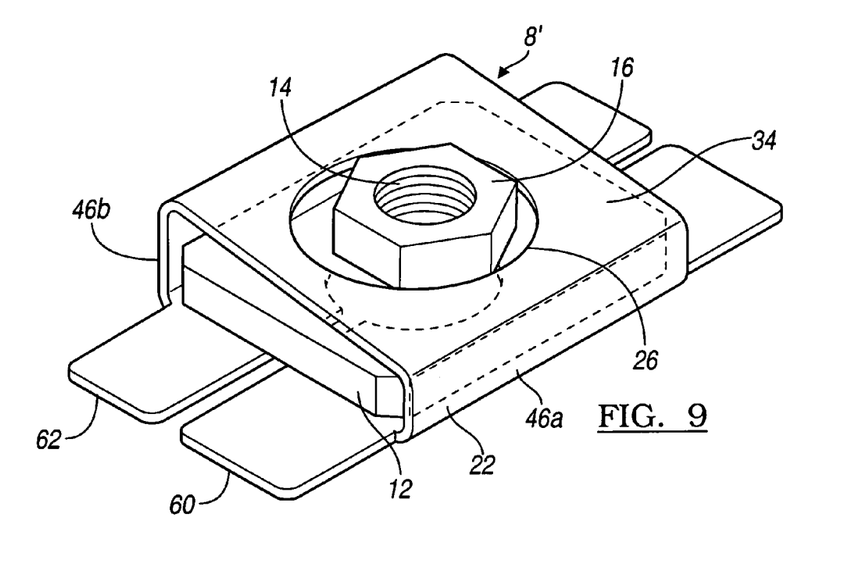
FIG. 9 is a perspective view of an alternate cage nut fastener in its assembled condition.

FIG. 8 represents a perspective view of the unfolded cage. The cage 22 is formed by folding the generally rectangular form into a box section. Defined on the exterior edge of the unfolded cage is a pair of semi-circular cutouts 78 and 80 which define the aperture 26 once the cage 22 has been folded. Further defined is a cutout portion 82 which is used to locate and index the part upon welding to the body 70.

With reference to FIGS. 9–11c, an alternate cage nut fastener, shown generally at 8', has a hexagonal body 16 coupled to a planar base 12. The body 16 and planar base 12 define a threaded through bore 14. Planar base 12 has an upper base surface 18 and lower base surface 20. The cage nut assembly 8 further has a cage 22 which is generally disposed about the planar base 12. The cage 22 has a cage upper surface 34 and cage lower surface 32. The cage 22 lower surface is defined by a pair of co-planar flanges 28. The upper surface 34 defines a through hole 26 which generally corresponds to the shape of the hexagonal body 16.

Figures 10A, 10B:
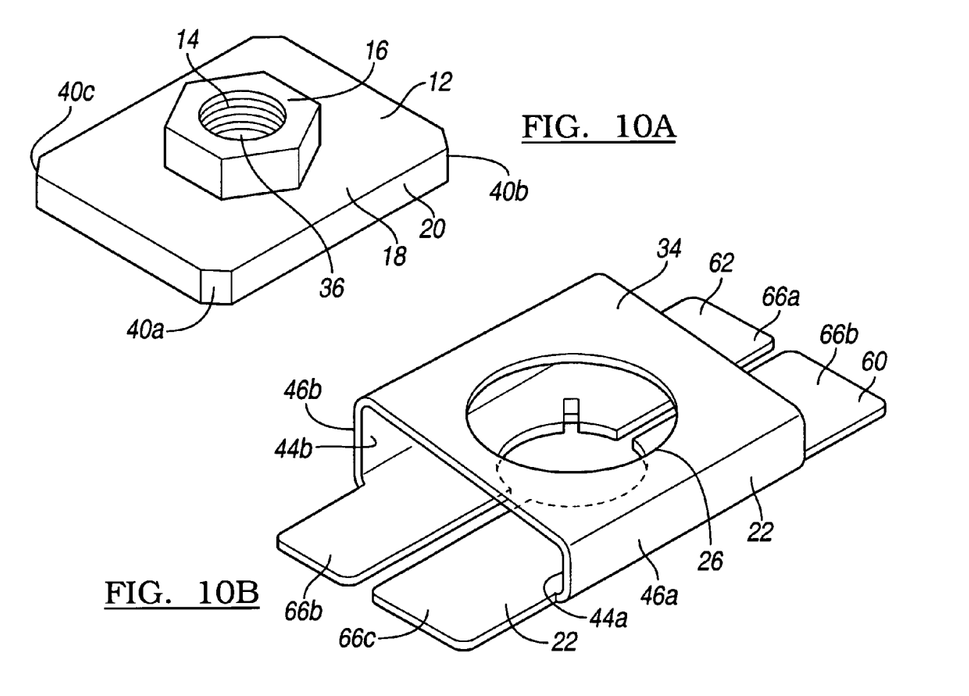
FIG. 10a and 10b represent a perspective view of the nut and base plate of the present invention.

As best seen in FIG. 10a, the hexagonal body 16 takes the form of a hex nut 38 coupled to the planar base 12. The planar base 12 defines a hole 36 which is co-axial to the threaded through bore 14 of the hex nut 38. It is preferred that the hex nut 38 be of a type 10 hex nut or other suitable size defined by the needed configuration. Also, it is preferred that the hex nut 38 be of sufficient hardness through either heat treatment or metallurgy to ensure the proper coupling to the mating bolt (not shown). As described above, the sidewalls 46a and 46b vary in length so as to allow the rotation of the fastener within the cage 22.

As seen in FIG. 10a, each corner 40a–d of the planar base 12 has defined flats 42a–d which function as load bearing surfaces to apply distributed loads to an interior surface 44a and 44b of the depending sidewalls 46a and 46b of the cage 22 when a bolt is inserted.

Figure 11A:
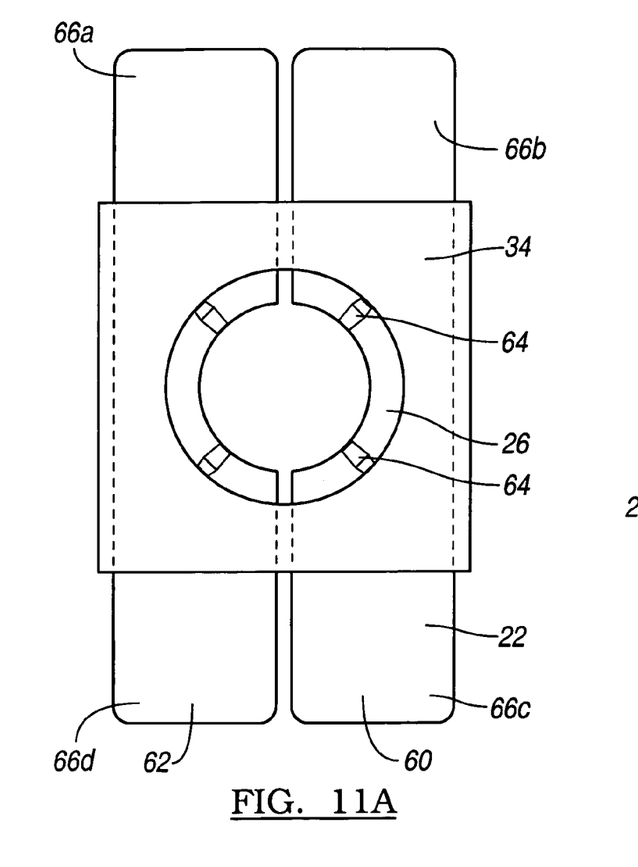
FIGS. 11a–11c represent top, side, and end views of the cage shown in FIG. 9.
Figure 11B:
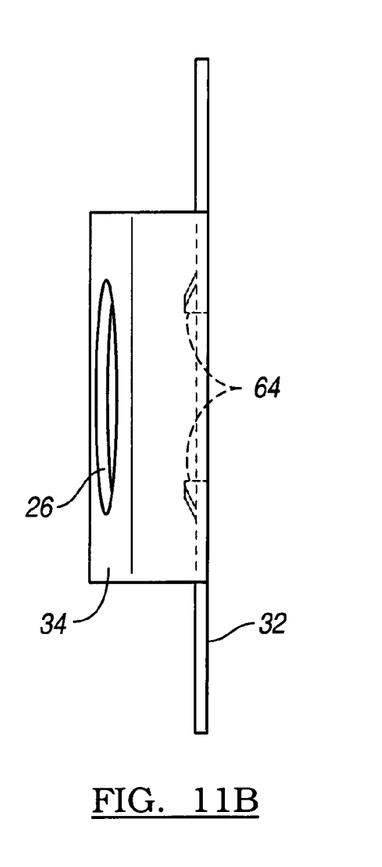
Figure 11C:
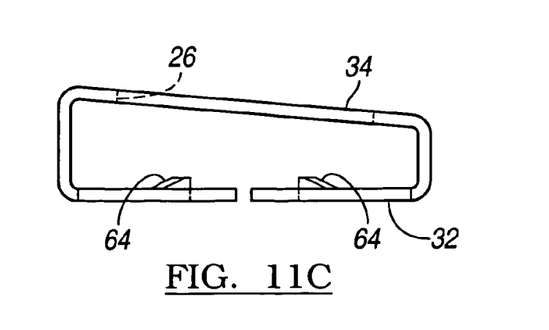

As best seen in FIGS. 11a–11c, the cage 22 is formed of a single folded piece of sheet metal 48. The cage 22 has a through hole 50 which has a diameter larger than the diameter of the hex nut 38. The side 52 of the hole 50 limits the travel of the hex nut 38 within the cage 22.

The pair of depending sidewalls 46a and 46b of the cage 22 functions to couple the top member 54 of the cage 22 to the weldable lower members 56. Additionally, the depending sidewalls 46a and 46b absorb torsional energy imparted onto the cage 22 by the corners 40a–d of the base 12. The height of the cage 22 minimizes the movement of the base 12 away from the lower members 56 and further allows the hex nut 38 to rotate to ensure proper alignment upon driving of the coupling threaded fastener (not shown).

Figure 12A:
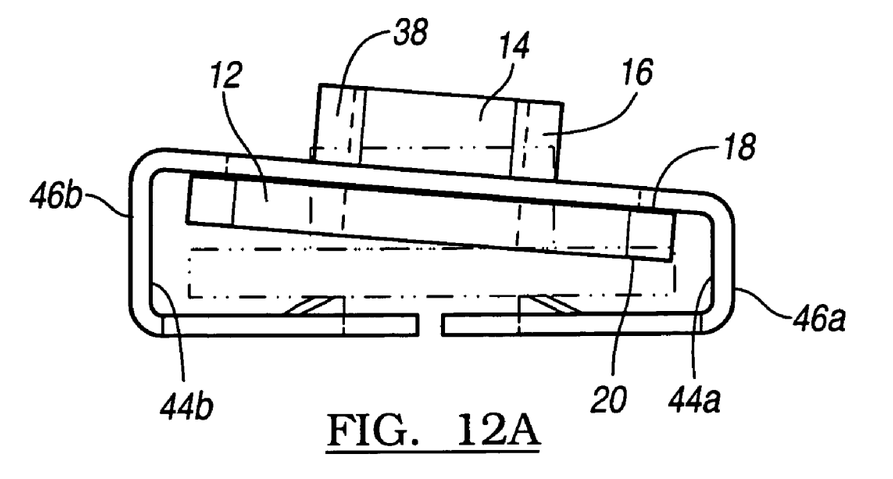
FIGS. 12a and 12b represent side views of the caged fastener shown in FIG. 9.
Figure 12B:
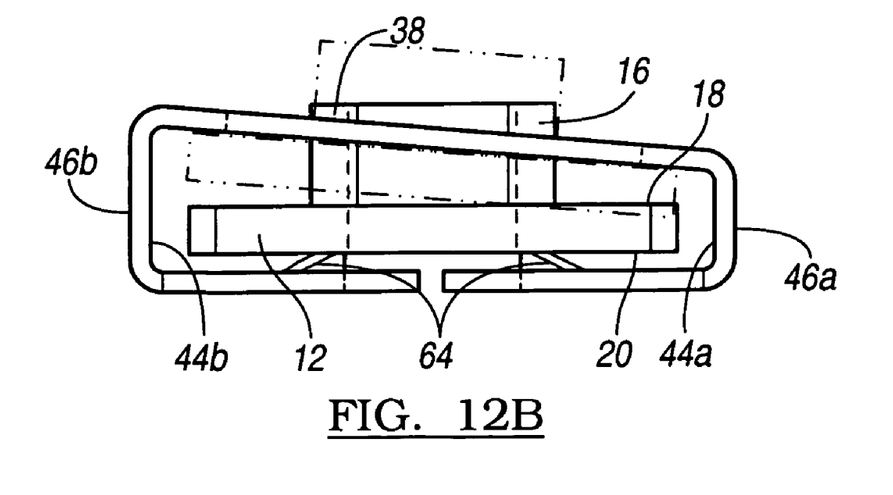

As seen in FIGS. 12a and 12b, the lower members 56 define a through hole 58 which is co-axial to the passage of the hex nut 38 and the planar base 12. Additionally formed on the two sides 60 and 62 defining the lower members 56 are a number of upturned tabs 64 which raise the base 12 above the lower members 56 to prevent adhesion during painting applications. Additionally defined on the lower members 56 are four weldment pad areas 66a–d which provide the area to allow for welding of the cage to the base substrate material. Defined generally equidistant between the two sides 60 and 62 is a seam, formed when the cage is wrapped around the base 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A floating fastener assembly adapted to be welded to a surface comprising:
    a body coupled to a planar base; and
    a cage adapted to enclose the planar base, wherein the cage has a weldable first member adapted to be welded to a surface, and first and second depending sidewalls which function to couple at least one cage top member to the weldable first member, said first depending sidewall having a first height less than the height of the second depending sidewall,
    wherein the planar base is translatable and rotatable within and relative to the cage toward the weldable first member to ensure proper alignment when the body engages a mating fastener, wherein the cage top member defines a through hole which has a diameter larger than the diameter of the body, said top member being formed of a pair of co-planar members.

2. The floating fastener assembly in accordance with claim 1, wherein the cage forms upper and lower bearing surfaces.

3. The floating fastener assembly in accordance with claim 1, wherein the cage is wrapped around the planar base.

4. The floating fastener assembly in accordance with claim 1, wherein the planar base defines a hole which is co-axial to a threaded bore defined by the body.

* * * * *